United States Patent
Okada et al.

(10) Patent No.: US 12,391,309 B2
(45) Date of Patent: Aug. 19, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Kotaro Okada, Kashiba (JP); Kazuki Itazuri, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 18/508,642

(22) Filed: Nov. 14, 2023

(65) Prior Publication Data
US 2024/0158006 A1 May 16, 2024

(30) Foreign Application Priority Data
Nov. 16, 2022 (JP) .................... 2022-183603

(51) Int. Cl.
- B62D 6/00 (2006.01)
- B62D 5/04 (2006.01)
- B62D 15/02 (2006.01)

(52) U.S. Cl.
CPC ............ *B62D 6/002* (2013.01); *B62D 5/04* (2013.01); *B62D 6/008* (2013.01); *B62D 15/0265* (2013.01); *B62D 15/025* (2013.01)

(58) Field of Classification Search
CPC .......... B62D 6/002; B62D 5/04; B62D 6/008; B62D 15/0265; B62D 15/025
See application file for complete search history.

(56) References Cited

U.S. PATENT DOCUMENTS

| 6,092,619 A * | 7/2000 | Nishikawa ........... G05D 1/0246 180/204 |
| 2024/0158003 A1* | 5/2024 | Okada .................... B62D 6/008 |
| 2024/0158004 A1* | 5/2024 | Okada .................... B62D 6/002 |

(Continued)

FOREIGN PATENT DOCUMENTS

| EP | 0 806 336 B1 | 6/2006 |
| JP | 2022-068056 A | 5/2022 |

OTHER PUBLICATIONS

May 13, 2024 Extended Search Report issued in European Patent Application No. 23209437.5.

*Primary Examiner* — Phutthiwat Wongwian
*Assistant Examiner* — Susan E Scharpf
(74) *Attorney, Agent, or Firm* — Oliff PLC (57) ABSTRACT

A steering control device that controls a steering device, includes a processing unit. The processing unit executes; a target rudder angle variable acquisition process of acquiring a value of a target rudder angle variable, an attention information acquisition process, a target rudder angle correction process of correcting the value of the target rudder angle variable by a play compensation amount corresponding to a steering direction, a restriction process of restricting the correction of the value of the target rudder angle variable by the play compensation amount depending on the information, and a rudder angle control process of operating a motor. In the rudder angle control process a steering angle depending on a rotation angle of a steering shaft is adopted as a control amount and the value of the target rudder angle variable is adopted as a target value of the control amount.

8 Claims, 9 Drawing Sheets

(56) References Cited

U.S. PATENT DOCUMENTS

| | | | |
|---|---|---|---|
| 2024/0158005 A1* | 5/2024 | Okada | B62D 1/283 |
| 2024/0158008 A1* | 5/2024 | Okada | B62D 6/008 |
| 2025/0121876 A1* | 4/2025 | Okada | B62D 5/0463 |
| 2025/0121877 A1* | 4/2025 | Okada | B62D 6/003 |

* cited by examiner

STEERING CONTROL DEVICE

CROSS-REFERENCE TO RELATED APPLICATION

This application claims priority to Japanese Patent Application No. 2022-183603 filed on Nov. 16, 2022, incorporated herein by reference in its entirety.

BACKGROUND

1. Technical Field

The present disclosure relates to a steering control device.

2. Description of Related Art

For example, Japanese Unexamined Patent Application Publication No. 2022-68056 describes a control device that corrects a target steering angle depending on a steering direction. In this device, when a planned steering direction is a right steering direction, the target steering angle is corrected by a play amount that is a value corresponding to the right steering direction. The play amount is the maximum of an amount in which a turning angle of a turning wheel does not change even when a steering angle changes.

Meanwhile, a technology of performing steering intervention for the purpose of the avoidance of the departure from a lane, the avoidance of an obstacle, and the like has been proposed.

SUMMARY

In the case where the above steering intervention is performed after the correction by the play amount is performed and where the steering direction of the steering intervention is the opposite direction of the play amount, the controllability of the steering intervention can decrease.

1. A steering control device according to the present disclosure is a steering control device that controls a steering device. The steering device includes a steering shaft, a turning wheel of a vehicle, the turning wheel turning due to rotation of the steering shaft, and a motor rotating the steering shaft. The steering control device includes a processing unit configured to execute a target rudder angle variable acquisition process, an attention information acquisition process, a target rudder angle correction process, a restriction process, and a rudder angle control process. The target rudder angle variable acquisition process is a process of acquiring the value of a target rudder angle variable, the target rudder angle variable being a variable that indicates a turning angle of the turning wheel. The attention information acquisition process is a process of acquiring information that needs to be given attention to for traveling of the vehicle. The target rudder angle correction process is a process of correcting the value of the target rudder angle variable by a play compensation amount corresponding to a steering direction, the steering direction being a direction in which the value of the target rudder angle variable changes. The restriction process is a process of restricting the correction of the value of the target rudder angle variable by the play compensation amount, depending on the information that needs to be given attention to. The rudder angle control process is a process of operating the motor by a control in which a steering angle depending on a rotation angle of the steering shaft is adopted as a control amount and the value of the target rudder angle variable is adopted as a target value of the control amount.

In the above configuration, the correction of the value of the target rudder angle variable by the compensation amount is restricted depending on the information that needs to be given attention to. The information that needs to be given attention to is information that influences the value of the target rudder angle variable. Therefore, by restricting the correction depending on the information that needs to be given attention to, it is possible to restrain the occurrence of an affair in which the controllability of the control depending on the setting of the target rudder angle variable after that is decreased by the correction by the play compensation amount.

2. The restriction process may include a process of restricting the magnitude of the play compensation amount to a small side. In the above configuration, by restricting the magnitude of the play compensation amount to the small side, it is possible to restrain an excessive increase in the magnitude of the correction amount for the value of the target rudder angle variable.

3. The processing unit may be configured to execute a gradual change process, the gradual change process being a process of gradually changing the play compensation amount depending on change in the steering direction, and the restriction process may include a process of restricting a speed of change in the magnitude of the play compensation amount, to a small side.

In the above configuration, by restricting the change speed of the play compensation amount to the small side, it is possible to restrain a rapid change in the correction amount for the value of the target rudder angle variable. 4. In the steering control device, the attention information acquisition process may include a process of acquiring at least one of three pieces of information: information relevant to a lane on which the vehicle travels, information relevant to another vehicle that is near the vehicle, and information relevant to a physical body that obstructs the traveling of the vehicle at a traveling-directional forward position.

5. The processing unit may be configured to execute the rudder angle control process in an automatic steering mode, and may be configured to execute a play displacement calculation process and a base amount setting process. The play displacement calculation process may be a process of calculating a play displacement whenever the steering angle changes, the play displacement being an amount that identifies a position in a region where the turning angle does not change despite change in the steering angle. The base amount setting process may be a process of setting a play base amount corresponding to a right steering direction and a play base amount corresponding to a left steering direction, to amounts that allow the steering angle to be values of end portions of the region, depending on the play displacement at a time when the automatic steering mode is satisfied. The restriction process may include a process of restricting the magnitude of the play compensation amount to a smaller value than the magnitude of the play base amount.

The play base amount is an appropriate compensation amount for controlling the turning angle depending on the steering, because the value of the target rudder angle variable is corrected to the end portion of the region where the turning angle does not change despite the change in the steering angle. However, in the case where the magnitude of the play base amount is large, there is concern of the interference with the control depending on the setting of the value of the target rudder angle variable after the setting of the play compensation amount. Hence, in the above configuration, the magnitude of the play compensation amount is set to a smaller value than the magnitude of the play base amount. Thereby, it is possible to restrain the occurrence of an affair in which the setting of the play compensation amount interferes with the control depending on the setting of the value of the target rudder angle variable after the setting of the play compensation amount.

6. The attention information acquisition process may include a process of acquiring information indicating that the vehicle departs from a lane, and the restriction process may include a process of restricting the correction of the value of the target rudder angle variable by the play compensation amount corresponding to the steering direction that is a direction in which the vehicle departs from the lane, when the information indicating that the vehicle departs from the lane is acquired.

In the above configuration, the correction of the value of the target rudder angle variable by the play compensation amount corresponding to the steering direction that is the direction in which the vehicle departs from the lane is restricted. Thereby, it is possible to restrain the execution of the steering that causes the vehicle to depart from the lane.

7. The attention information acquisition process may include a process of acquiring information relevant to another vehicle that is near the vehicle, and the restriction process may include a process of restricting the correction of the value of the target rudder angle variable by the play compensation amount corresponding to the steering direction that is a direction in which the vehicle approaches the other vehicle.

In the above configuration, the correction of the value of the target rudder angle variable by the play compensation amount corresponding to the steering direction that is the direction in which the vehicle approaches the near vehicle is restricted. Thereby, it is possible to restrain the execution of the steering that causes the vehicle to approach the near vehicle 8. The attention information acquisition process may include a process of acquiring information relevant to a physical body that obstructs the traveling of the vehicle at a traveling-directional forward position, and the restriction process may be a process of restricting the correction of the value of the target rudder angle variable by the play compensation amount relevant to the steering direction that is a direction in which the vehicle approaches the physical body.

In the above configuration, the correction of the value of the target ruder angle variable by the play compensation amount relevant to the steering direction that is the direction in which the vehicle approaches the physical body is restricted. Thereby, it is possible to restrain the execution of the steering that causes the vehicle to get to the physical body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Base Configuration

A first embodiment will be described below with reference to the drawings. A steering device 10 shown in FIG. 1 includes a steering wheel 12. A steering shaft 14 is coupled to the steering wheel 12. An end portion of the steering shaft 14 on the opposite side of the steering wheel 12 is coupled to an input shaft of the bevel gear unit 16. An output shaft of the bevel gear unit 16 is coupled to an input shaft of a hydraulic power steering device 20 through a dynamic power transmission shaft 18. A sector shaft of the hydraulic power steering device 20 is coupled to one end portion of a pitman arm 22. The other end portion of the pitman arm 22 is coupled to one end portion of a drag link 24. The other end portion of the drag link 24 is coupled to one end portion of a knuckle arm 26. The other end portion of the knuckle arm 26 is coupled to a kingpin shaft 28 of a right turning wheel 40(R). The kingpin shaft 28 of the right turning wheel 40(R) and a kingpin shaft 28 of a left turning wheel 40(L) are coupled by a tie rod arm 30 and a tie rod 32.

Figure 1:
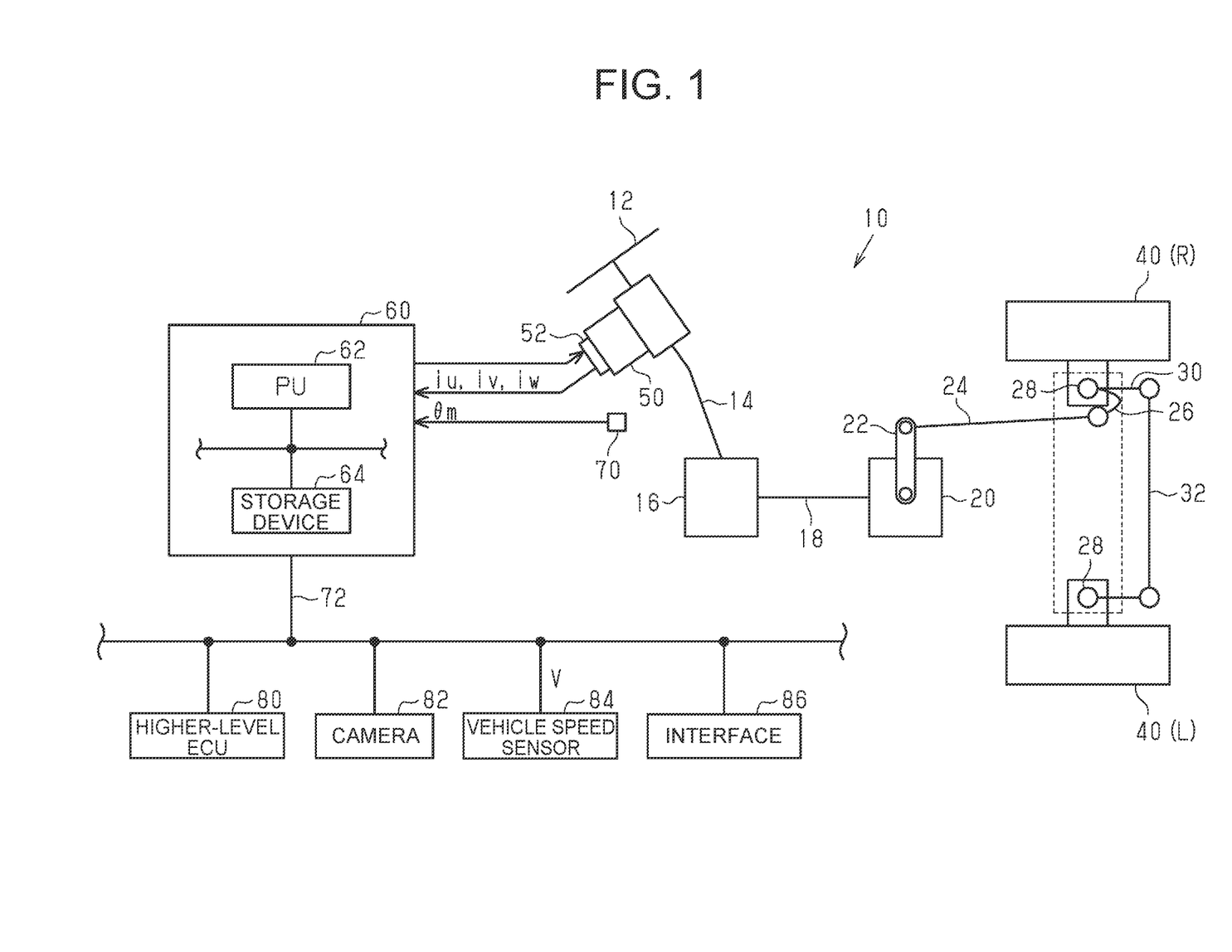
FIG. 1 is a block diagram showing the configuration of a steering system according to a first embodiment.

The rotation power of the motor 50 is transmitted to the steering shaft 14. As an example, the motor 50 is a synchronous electric motor. The output voltage of an inverter 52 is applied to a terminal of the motor 50.

A steering control device 60 controls the steering device 10 as a control object. For the control of the control object, the steering control device 60 refers to a rotation angle θm of the motor 50 that is detected by a rotation angle sensor 70. Further, the steering control device 60 refers to electric currents iu, iv, iw that flow through respective terminals of the motor 50. For example, the electric currents iu, iv, iw may be detected as voltage drop amounts by shunt resistances provided on respective legs of the inverter 52. The steering control device 60 refers to a vehicle speed V detected by a vehicle speed sensor 84, through a network 72.

The steering control device 60 can communicate with a higher-level ECU 80 through the network 72. The higher-level ECU 80 executes a process of generating a command for intervening in the steering of a vehicle, independently of the instruction of the steering by the operation of the steering wheel 12. In other words, the higher-level ECU 80 executes an automatic steering process. The automatic steering process in the embodiment is a process of performing steering intervention for avoiding a situation where the vehicle departs from a lane due to the operation of the steering wheel 12 by a driver, when the situation is about to occur. For executing the automatic steering process, the higher-level ECU 80 acquires image data about the periphery of the vehicle that is photographed by a camera 82. Further, the higher-level ECU 80 knows an intention that is input by the driver and that indicates whether the automatic steering process is executed, and the like, through an interface 86.

The steering control device 60 includes a processing unit 62 (referred to as a "PU 62", hereinafter) and a storage device 64. The PU 62 is a software processing unit such as a CPU, a GPU, and a TPU. The storage device 64 may be an electrically non-rewritable non-volatile memory. Further, the storage device 64 may be an electrically rewritable non-volatile memory or a storage medium such as a disk medium. The PU 62 executes a program stored in the storage device 64, so that the steering control device 60 executes the process of controlling the control object.

Characteristic of Steering Device 10

The above-described steering device 10 has a complex link structure, and therefore a so-called play in which the turning wheel 40 does not rotate despite the rotation of the steering shaft 14 is large.

Figure 2:
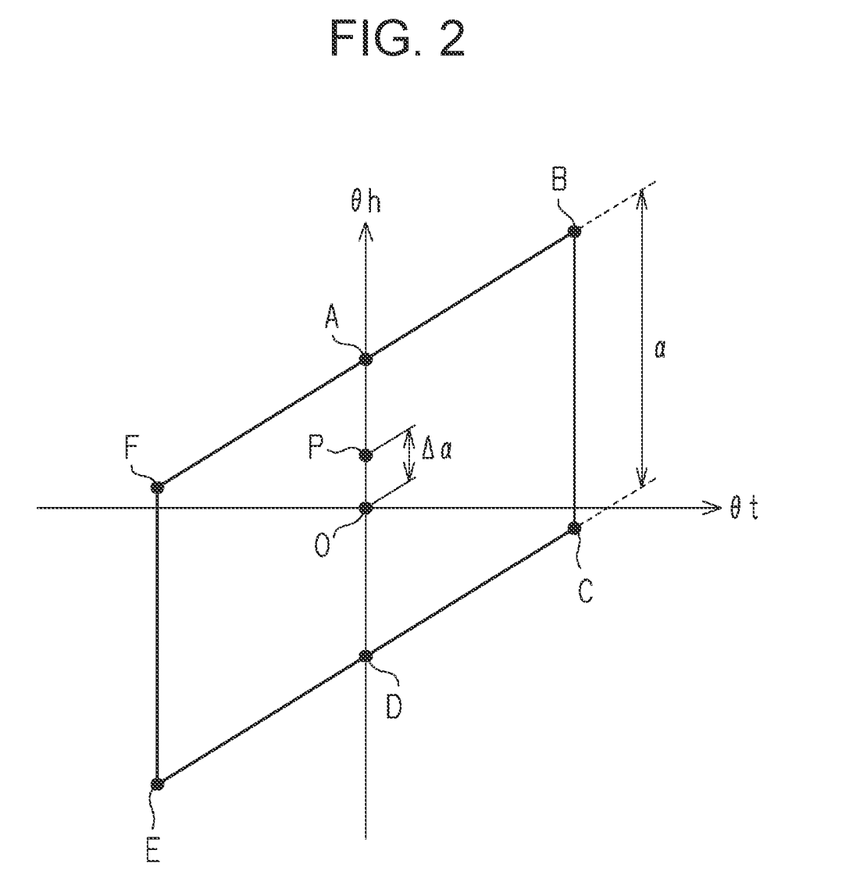
FIG. 2 is a diagram showing the relation between a steering angle and a turning angle according to the first embodiment.

FIG. 2 shows the relation between a steering angle $\theta h$ and a turning angle $\theta t$. The steering angle $\theta h$ is the rotation angle of the steering shaft 14. On the other hand, the turning angle $\theta t$ is the moving angle of a tire for the turning wheel 40. Further, a neutral position O described in FIG. 2 is a point where both of the steering angle $\theta h$ and the turning angle $\theta t$ are zero. This means that both of the steering angle $\theta h$ and the turning angle $\theta t$ indicate a straight-movement direction. Hereinafter, the rotation angle in the right turn direction is a positive angle, and the rotation angle in the left turn direction is a negative angle.

As shown in FIG. 2, even when the steering angle $\theta h$ is changed from the neutral position O in the right turn direction, the turning angle $\theta t$ does not change until the steering angle $\theta h$ reaches a point A. Then, when the steering angle $\theta h$ becomes a further large value than the point A, the turning angle $\theta t$ increases.

Further, even when the steering angle $\theta h$ is decreased at a point B, the turning angle $\theta t$ does not change. In other words, even when the steering direction is switched to the left side at the point B, the turning angle $\theta t$ does not change. The steering direction is a direction that is indicated by the rotation speed of the steering shaft 14. Then, when the steering angle $\theta h$ becomes a further small value beyond a point C, the turning angle $\theta t$ decreases. In other hands, the steering angle $\theta h$ is a negative value, and when the absolute value of the steering angle $\theta h$ is further increased beyond the point C, the turning angle $\theta t$ decreases.

Then, at a point D where the turning angle $\theta t$ becomes zero, the steering angle $\theta h$ becomes a negative value. A point E is a value that is obtained by further displacing the steering angle $\theta h$ in the left steering direction after the turning angle $\theta t$ becomes zero. Even when the steering angle $\theta h$ is increased at the point E, the turning angle $\theta t$ does not change until the steering angle $\theta h$ reaches a point F. When the steering angle $\theta h$ becomes further large beyond the point F, the turning angle $\theta t$ increases.

In this way, for example, in the case of the position of the point B, the turning angle $\theta t$ does not change even when the steering angle $\theta h$ changes between the point B and the point C. Further, for example, in the case of the position of the point E, the turning angle $\theta t$ does not change even when the steering angle $\theta h$ changes between the point E and the point F. In this way, due to the play of the steering device 10, there is a region where the turning angle $\theta t$ does not change despite the change in the steering angle $\theta h$. This region is not a region that includes fixed values of the steering angle $\theta h$ but a region that can be changed by a history of the change in the steering angle $\theta h$.

The displacement of the steering angle $\theta h$ from the point B to the point C occurs at the time of the switching-back from the right turn. Further, the displacement of the steering angle $\theta h$ from the point E to the point F occurs at the time of the switching-back from the left turn. The length of the region where the turning angle $\theta t$ does not change despite the change in the steering angle $\theta h$ at the time of the switching-back is described as "$\alpha$" in FIG. 2. Further, "$\alpha$" is previously stored in the storage device 64. For example, "$\alpha$" may be a fixed value. Further, for example, "$\alpha$" may be a value that is often updated. For example, the update process for "$\alpha$" can be executed as follows.

1. The PU 62 rotates the steering shaft 14 by controlling the rotation angle of the motor 50 at the time of the stop of the vehicle. 2. The PU 62 identifies an end portion of the above region by the rotation angle of the motor 50 immediately before the electric current flowing through the motor 50 with respect to the rotation of the motor 50 exceeds a threshold.

The PU 62 estimates "$\alpha$" by performing the control of the rotation angle of the motor 50 described in "1" and "2" for both of right rotation and left rotation. The PU 62 updates the "$\alpha$" stored in the storage device 64, by the estimated "$\alpha$". For example, the PU 62 may store the estimated "$\alpha$" in the storage device 64. Further, for example, in the storage device 64, the PU 62 may newly store a value resulting from weighted average processing between the estimated "$\alpha$" and the "$\alpha$" stored in the storage device 64.

Setting of Play Base Amount

The above region causes the decrease in the responsiveness of the change in the turning angle $\theta t$ with respect to the change in the steering angle $\theta h$. Therefore, in the embodiment, the decrease in the responsiveness is restrained by a play compensation amount. First, the setting of a play base amount that is a base amount for calculating the play compensation amount will be described.

Figure 3:
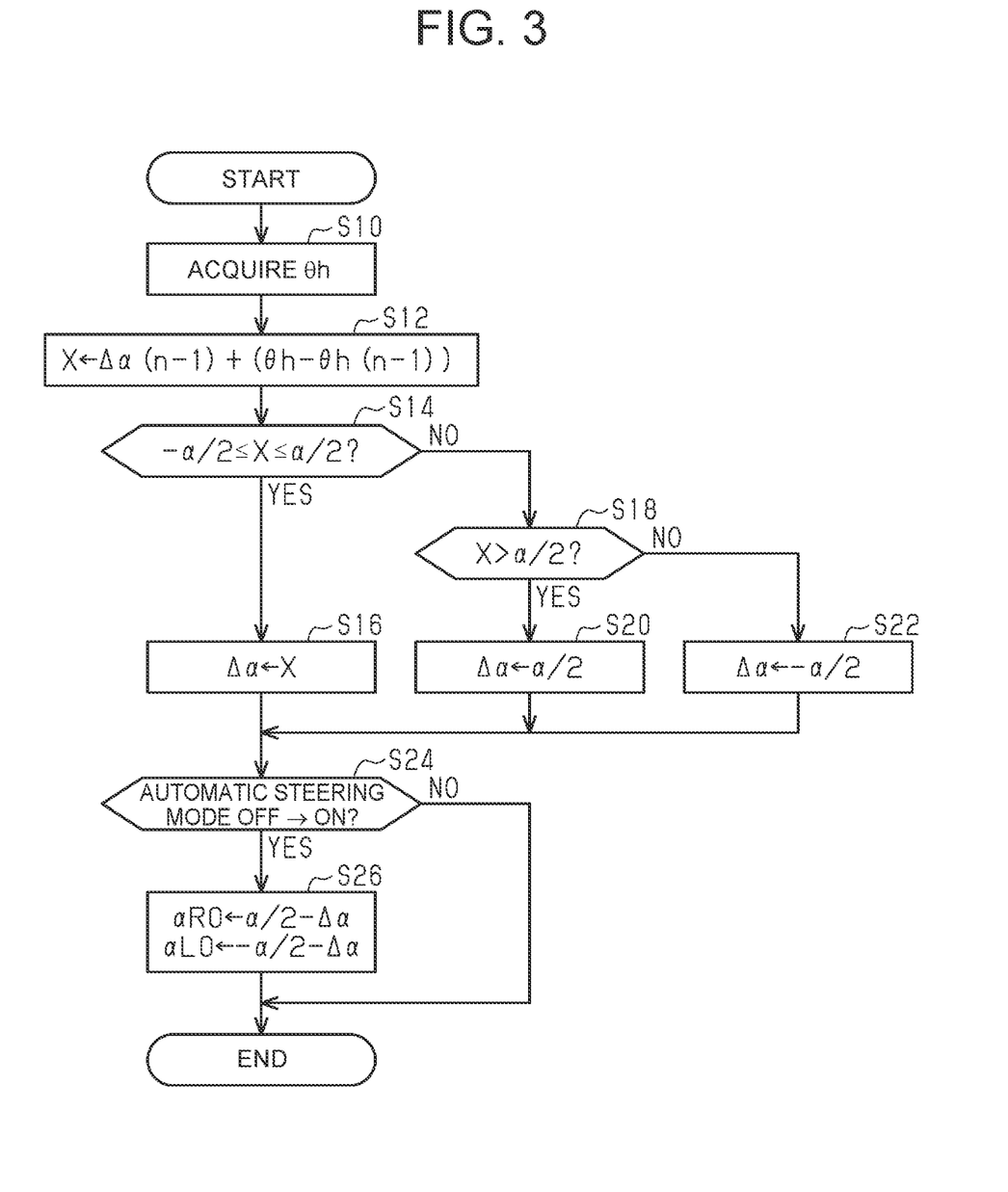
FIG. 3 is a flowchart showing a procedure of a process that is executed by a control device according to the first embodiment.

FIG. 3 shows a procedure of a process relevant to the setting of the play base amount. The process shown in FIG. 3 is realized when the PU 62 repeatedly executes a program stored in the storage device 64 with a predetermined period, for example. Hereinafter, step numbers for processes are expressed as numerals in which "S" is put to the head.

In a sequence of processes shown in FIG. 3, the PU 62 acquires the steering angle $\theta h$ (S10). The steering angle $\theta h$ is calculated by integration processing of the rotation angle $\theta m$, by the PU 62. Next, the PU 62 calculates a variable X for calculating a play displacement, by the following expression (S12). $X \leftarrow \Delta\alpha(n-1)+(\theta h-\theta h(n-1))$ In the above expression, "n−1" means a value at the last execution timing before the execution timing of the sequence of processes shown in FIG. 3. That is, "$\Delta\alpha(n-1)$" means a play displacement $\Delta\alpha$ at the last execution timing of the sequence of processes shown in FIG. 3. Further, "θh(n−1)" means a value acquired in the process of S10 at the last execution timing of the sequence of processes shown in FIG. 3.

FIG. 2 exemplifies the play displacement Δα. FIG. 2 shows a state where the steering angle θh has reached the position of the point P because the steering angle θh has been changed from the neutral position O to the right by the play displacement Δα. Back to FIG. 3, the PU 62 determines whether the value of the variable X is equal to or larger than "−α/2" and is equal to or smaller than "α/2" (S14). In the case where the PU 62 makes the positive determination in the process of S14, the PU 62 substitutes the value of the variable X into the play displacement Δα (S16).

On the other hand, in the case where the PU 62 makes the negative determination in the process of S14, the PU 62 determines whether the value of the variable X is larger than "α/2" (S18). In the case where the PU 62 determines that the value of the variable X is larger than "α/2" (S18: YES), the PU 62 substitutes "α/2" into the play displacement Δα (S20). This process corresponds to a situation in which the steering angle θh has been greatly changed to the right beyond the point A in FIG. 2, for example. In that case, the play displacement Δα is positioned at the end portion in the right steering direction of the region where the turning angle θt does not change despite the change in the steering angle θh. When the length of the region is "α" and the center of the region is defined as "0", the play displacement Δα at the end portion in the right steering direction of the above region is "α/2".

On the other hand, in the case where the PU 62 makes the negative determination in the process of S18, the PU 62 substitutes "−α/2" into the play displacement Δα (S22). In the case where the PU 62 completes the processes of S16, S20, and S22, the PU 62 determines whether the switching to an automatic steering mode has been performed (S24). The automatic steering mode is a mode in which the above automatic steering process is executed. In the automatic steering mode, the higher-level ECU 80 outputs a target angle θt* to the steering control device 60. The target angle θt* is a variable that indicates the target value of the turning angle of the turning wheel 40. The change amount of the target θt* is quantified so as to be equal to the change amount of the steering angle θh between the point F and the point B or between the point C and the point E shown in FIG. 2.

In the case where the PU 62 determines that the switching has been performed (S24: YES), the PU 62 sets a right play base amount αR0 and a left play base amount αL0 (S26). That is, the PU 62 substitutes "α/2−Δα" into the right play base amount αR0. Further, the PU 62 substitutes "−α/2−Δα" into the left play base amount αL0.

For example, in the case where the play displacement Δα is positioned at the point P shown in FIG. 2 at the time when the switching to the automatic steering mode has been performed, the turning angle does not change until the steering angle θh changes by "α/2−Δα", even when the target angle θt* is changed in the right steering direction. Therefore, for enhancing the responsiveness of the turning angle with respect to the change in the target angle θt*, it is desirable to correct the target angle θt* by "α/2−Δα", by an open-loop control, with the change in the target angle θt* in the right steering direction. Therefore, the PU 62 substitutes "α/2−Δα" into the right play base amount αR0. Further, in the case where the play displacement Δα is positioned at the point P, the turning angle does not change until the steering angle θh changes by "−α/2−Δα", even when the target angle θt* is changed in the left steering direction. Therefore, for enhancing the responsiveness of the turning angle with respect to the change in the target angle θt*, it is desirable to correct the target angle θt* by "−α/2−Δα", by the open-loop control, with the change in the target angle θt* in the left steering direction. Therefore, the PU 62 substitutes "−α/2−Δα" into the left play base amount αL0.

Setting of Play Compensation Amount

Figure 4:
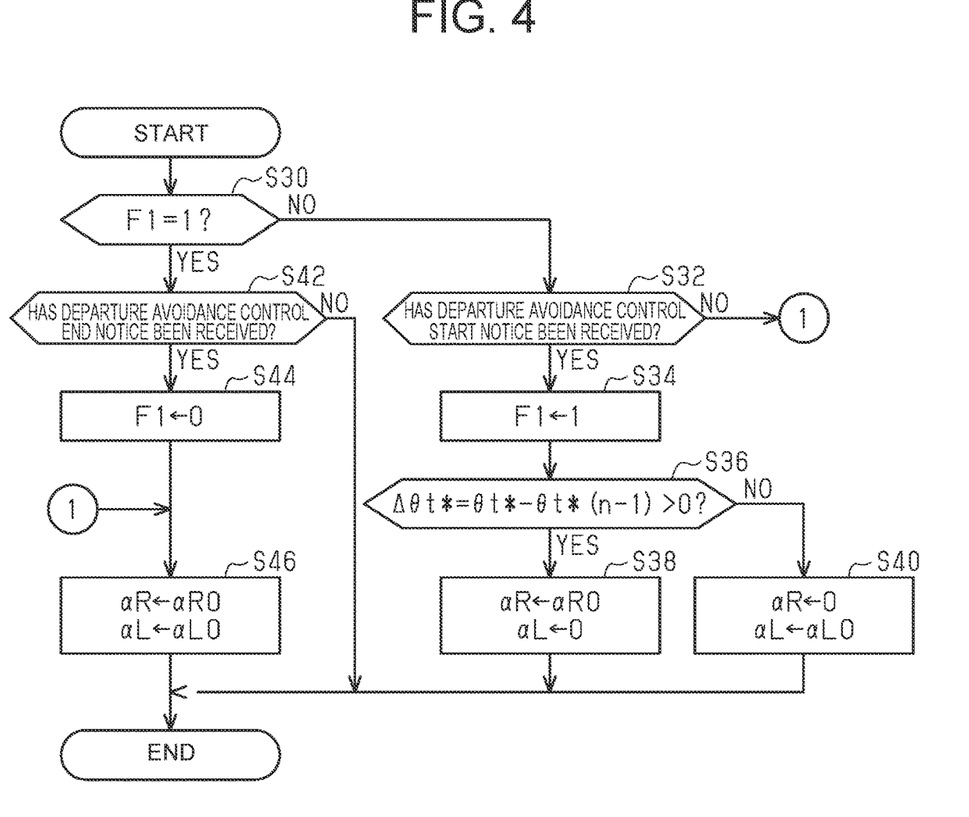
FIG. 4 is a flowchart showing a procedure of a process that is executed by the control device according to the first embodiment.

In the case where the PU 62 completes the process of S26 or makes the negative determination in the process of S24, the PU 62 ends the sequence of processes shown in FIG. 3 once. FIG. 4 shows a procedure of a process relevant to the setting of the play compensation amount. The process shown in FIG. 4 is realized when the PU 62 repeatedly executes a program stored in the storage device 64 with a predetermined period in the automatic steering mode, for example.

In a sequence of processes shown in FIG. 4, first, the PU 62 determines whether a flag F1 is "1" (S30). In the case where the flag F1 is "1", a steering intervention process for restraining the vehicle from departing from the lane is being executed. In the case where the flag F1 is "0", the steering intervention process is not being executed.

In the case where the PU 62 determines that the flag F1 is "0" (S30: NO), the PU 62 determines whether a start notice for a departure avoidance control has been received from the higher-level ECU 80 (S32). The start notice is given when the control to restrain the departure from the lane is started by the steering intervention. On this occasion, the higher-level ECU 80 gives also the steering direction for the departure avoidance. In the case where the PU 62 determines that the start notice has been received (S32: YES), the PU 62 substitutes "1" into the flag F1 (S34). Then, the PU 62 determines whether the steering direction for the departure avoidance by the higher-level ECU 80 is the right steering direction (S36).

In the case where the PU 62 determines that the steering direction is the right steering direction (S36: YES), the PU 62 transitions to S38. In the process of S38, the PU 62 substitutes the right play base amount αR0 into the right play compensation amount αR, and substitutes "0" into the left play compensation amount αL. On the other hand, in the case where the PU 62 determines that the steering direction is the left steering direction (S36: NO), the PU 62 transitions to S40. In the process of S40, the PU 62 substitutes "0" into the right play compensation amount αR, and substitutes the left play base amount αL0 into the left play compensation amount αL.

On the other hand, in the case where the PU 62 determines that the flag F1 is "1" (S30: YES), the PU 62 determines whether a departure avoidance control end notice has been received from the higher-level ECU 80 (S42). The departure avoidance control end notice is output from the higher-level ECU 80 when the steering intervention for the departure avoidance ends. The departure avoidance control end notice is not a notice indicating the end of the steering intervention itself. This will be described below based on FIG. 5.

Figure 5:
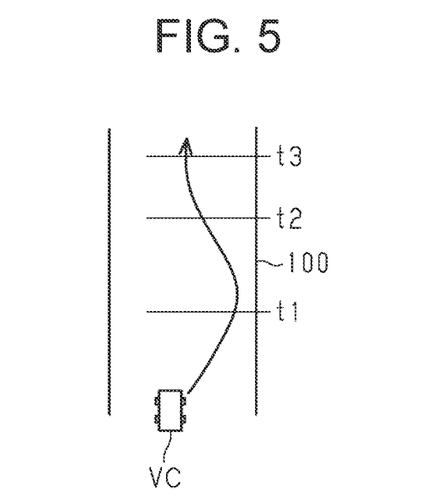
FIG. 5 is a diagram exemplifying a departure avoidance control according to the first embodiment.

FIG. 5 shows a case where an own vehicle VC excessively approaches the right side and is about to depart from the lane. In other words, FIG. 5 shows a case where the own vehicle VC excessively approaches a white line 100 on the right side. In this case, at time t1, the departure avoidance control start notice is output from the higher-level ECU 80. At time t2, the departure avoidance control end notice is output from the higher-level ECU 80. The time period from time t1 to time t2 is a time period during which the steering direction is the left side or the turning angle is a value on the left turn side and the steering angle is constant. Here, very small fluctuations of the turning angle by the feedback control are ignored. In the case where the turning angle at time t2 is maintained, the own vehicle VC approaches the left side of the lane. Hence, for causing the own vehicle VC to travel along the lane, the higher-level ECU 80 further executes the steering intervention from time t2 to time t3. In the time period from time t2 to time t3, a process after the end of the departure avoidance control is performed. That is, the time period from time t1 to time t2 is a time period during which the higher-level ECU 80 executes a control to cause the own vehicle VC to approach the left side. On the other hand, the time period from time t2 to time t3 is a time period during which the higher-level ECU 80 executes a control to cause the own vehicle VC to travel straight along the lane after the control to cause the own vehicle VC to approach the left side.

Back to FIG. 4, in the case where PU 62 determines that the departure avoidance control end notice has been received (S42: YES), the PU 62 substitutes "0" into the flag F1 (S44). In the case where the PU 62 completes the process of S44 or makes the negative determination in the process of S32, the PU 62 transitions to the process of S46. In the process of S46, the PU 62 substitutes the right play base amount αR0 into the right play compensation amount αR, and substitutes the left play base amount αL0 into the left play compensation amount αL.

Control of Turning Angle in Automatic Steering Mode

Figure 6:
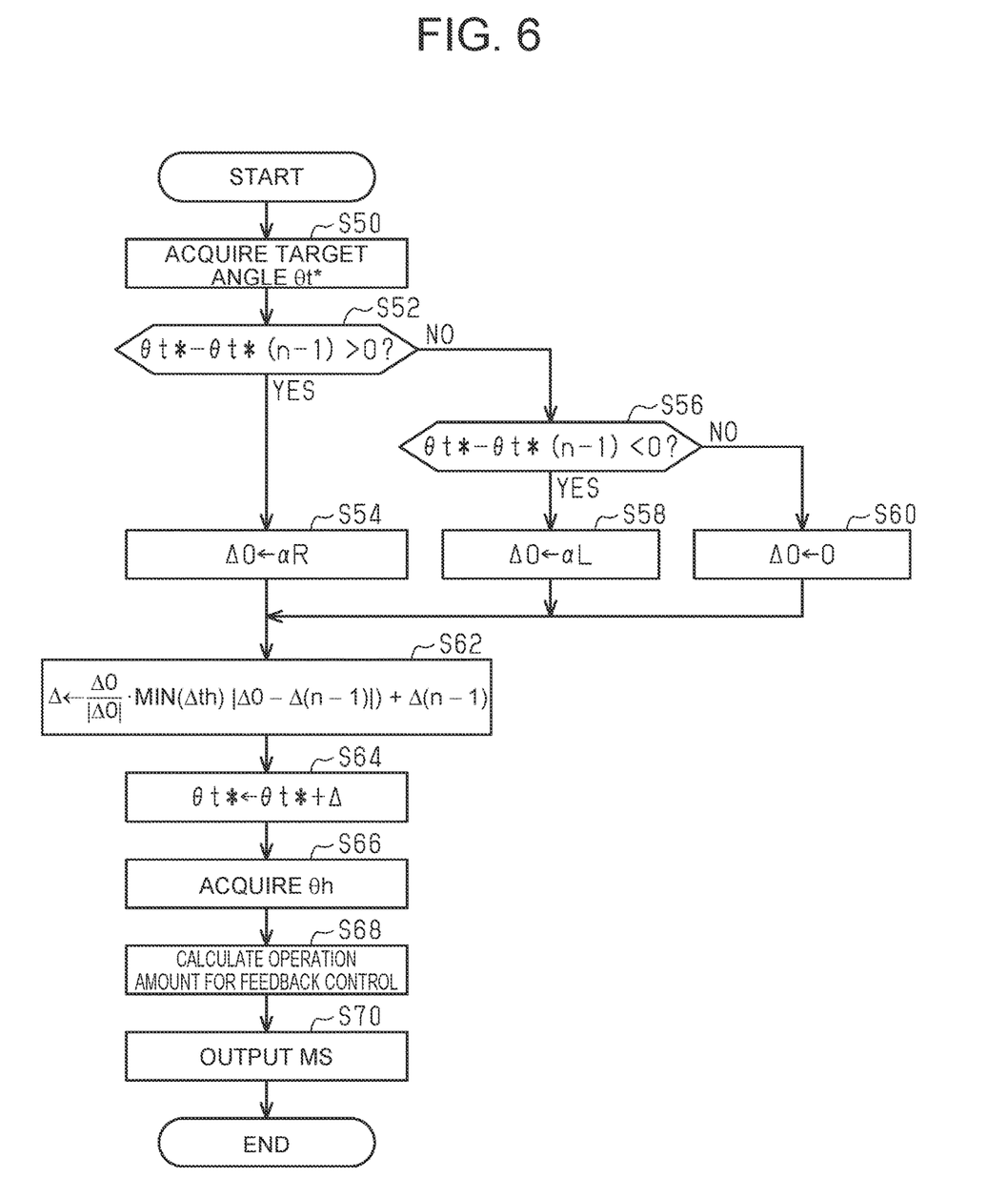
FIG. 6 is a flowchart showing a procedure of a process that is executed by the control device according to the first embodiment.

In the case where the PU 62 completes the process of S38, S40, or S46, the PU 62 ends the sequence of processes shown in FIG. 4 once. FIG. 6 shows a procedure of a process relevant to the control of the turning angle. The process shown in FIG. 6 is realized when the PU 62 repeatedly executes a program stored in the storage device 64 with a predetermined period in the automatic steering mode, for example.

In a sequence of processes shown in FIG. 6, first, the PU 62 acquires the target angle θt* that is output by the higher-level ECU 80 (S50). Next, the PU 62 determines whether the change in the target angle θt* is positive (S52). In other words, the PU 62 determines whether the change direction of the target angle θt* is the right steering direction. In the case where the change direction of the target angle θt* is the right steering direction, the instruction from the higher-level ECU 80 through the target angle θt* is the right steering. In FIG. 6, the target angle θt* acquired by the process of S50 at the previous execution timing of the sequence of processes in FIG. 6 is described as "θt*(n−1)".

In the case where the PU 62 determines that the change in the target angle θt* is positive (S52: YES), the PU 62 substitutes the right play compensation amount αR into a play compensation amount Δ0 (S54). On the other hand, in the case where the PU 62 makes the negative determination in the process of S52, the PU 62 determines whether the change in the target angle θt* is negative (S56). In other words, the PU 62 determines whether the change direction of the target angle θt* is the left steering direction. In the case where the PU 62 determines that the change in the target angle θt* is negative (S56: YES), the PU 62 substitutes the left play compensation amount αL into the play compensation amount Δ0 (S58).

In the case where the PU 62 makes the negative determination in the process of S56, the PU 62 substitutes "0" into the play compensation amount Δ0 (S60). In the case where the PU 62 completes the process of S54, S58, or S60, the PU 62 performs a guard process of restricting the magnitude of the change speed of the play compensation amount Δ0 to a small side (S62). The value after the guard process is a play compensation amount Δ. When the play compensation amount Δ at the last execution timing of the sequence of processes shown in FIG. 6 is "Δ(n−1)", the output of the process of S62 is shown as follows. (Δ0/|Δ0|) ·MIN(Δth|Δ0−Δ(n−1)|)+Δ(n−1)

An upper limit Δth specifies the maximum of the magnitude of the change amount of the play compensation amount Δ in the execution period of the processes shown in FIG. 6.

Next, the PU 62 substitutes a value resulting from adding the play compensation amount Δ to the target angle θt*, into the target angle θt* (S64). Next, the PU 62 acquires the steering angle θh (S66). Then, the PU 62 calculates an operation amount for a feedback control in which the steering angle θh is adopted as a control amount and the target angle θt* is adopted as the target variable of the control amount (S68). The operation amount may be the torque of the motor 50. Next, for controlling the motor 50 depending on the operation amount, the PU 62 outputs an operation signal MS to the inverter 52 (S70). Thereby, for example, in the case where the operation amount is the torque of the motor 50, the output voltage of the inverter 52 is operated such that the torque of the motor 50 becomes the operation amount. This process may be executed while the electric currents iu, iv, iw are adopted as inputs, for example.

In the case where the PU 62 completes the process of S70, the PU 62 ends the sequence of processes shown in FIG. 6 once. In a period during which the processes of S50 to S60 are executed, the processes of S62 to S70 may be executed multiple times. In that case, the play compensation amount Δ at the last execution timing of the process of S62 is "Δ(n−1)". Thereby, it is possible to more surely cause the play compensation amount Δ to converge on the play compensation amount Δ0 before the stop of the change in the target angle θt*.

Operation and Effect of Embodiment

The PU 62 sets the right play base amount αR0 and the left play base amount αL0 at the time of the switching to the automatic steering mode. Then, when the target angle θt* is changed in the right steering direction, the target angle θt* is corrected depending on the right play compensation amount αR depending on the right play base amount αR0. Further, when the target angle θt* is changed in the left steering direction, the target angle θt* is corrected depending on the left play compensation amount αL depending on the left play base amount αL0.

When the right play compensation amount αR is the right play base amount αR0 and the left play compensation amount αL is the left play base amount αL0, it is possible to accurately control the turning angle depending on the target angle θt* by controlling the steering angle θh to the target angle θt*. For example, in the time period from time t1 to time t2 exemplified in FIG. 5, there is a possibility that the target angle θt* is changed in the right steering direction due to the fine adjustment in the control. In that case, when the play compensation amount Δ is the right play base amount αR0, there is concern of the lack of the stability of the control to restrain the departure from the lane. Hence, the PU 62 sets the right play compensation amount αR in that case to zero. Thereby, it is possible to secure the stability of the control to restrain the departure from the lane.

Second Embodiment

For a second embodiment, differences from the first embodiment will be mainly described below with reference to the drawings.

Figure 7:
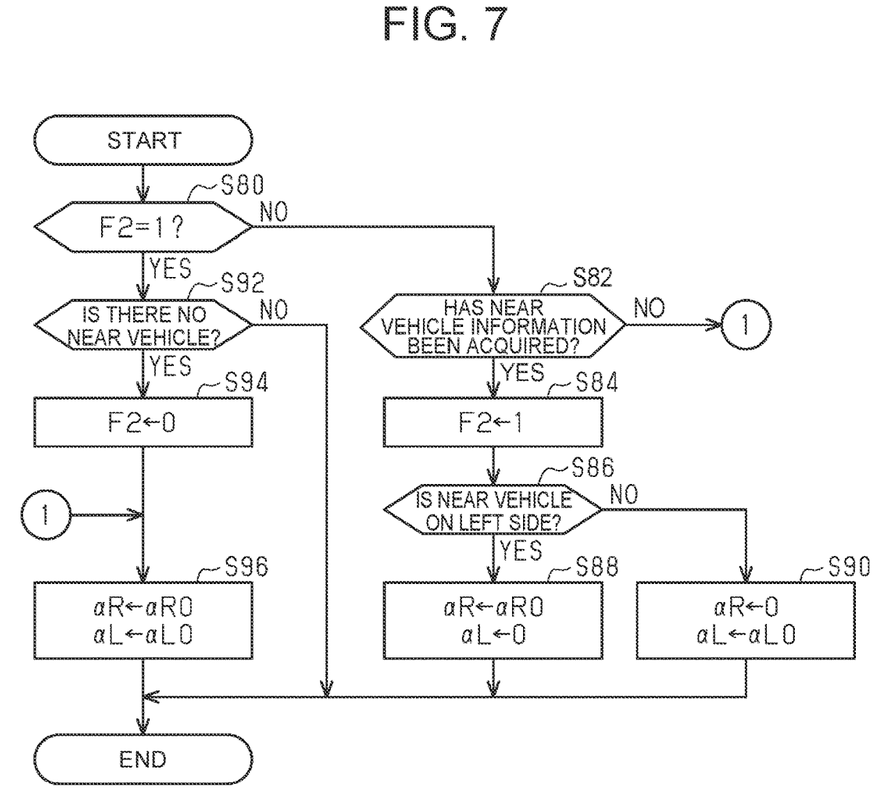
FIG. 7 is a flowchart showing a procedure of a process that is executed by a control device according to a second embodiment.

In the embodiment, a process in which the higher-level ECU 80 constantly performs the steering intervention such that the vehicle travels along the lane is assumed as an automatic driving process. FIG. 7 shows a procedure of a process relevant to the setting of the play compensation amount according to the embodiment. The process shown in FIG. 7 is realized when the PU 62 repeatedly executes a program stored in the storage device 64 with a predetermined period, for example.

In a sequence of processes shown in FIG. 7, first, the PU 62 determines whether a flag F2 is "1" (S80). In the case where there is a vehicle near the own vehicle, the flag F2 is "1". In the case where there is no vehicle near the own vehicle, the flag F2 is "0". In the case where the PU 62 determines that the flag F2 is "0" (S80: NO), the PU 62 determines whether information relevant to the vehicle near the own vehicle has been acquired from the higher-level ECU 80 (S82). That is, in the embodiment, the higher-level ECU 80 constantly monitors whether there is a vehicle near the own vehicle, based on the image data by the camera 82, and the like. Then, in the case where there is the near vehicle, the higher-level ECU 80 gives a notice of information indicating that there is the near vehicle and position information about the near vehicle, to the steering control device 60.

In the case where the information relevant to the near vehicle has been acquired (S82: YES), the PU 62 substitutes "1" into the flag F2 (S84). Then, the PU 62 determines whether the near vehicle is on the left side of the own vehicle (S86), based on the acquired information. In the case where the PU 62 determine that the near vehicle is on the left side of the own vehicle (S86: YES), the PU 62 transitions to the process of S88. In the process of S88, the PU 62 substitutes the right play base amount αR0 into the right play compensation amount αR, and substitutes "0" into the left play compensation amount αL.

On the other hand, in the case where the PU 62 determines that the near vehicle is on the right side of the own vehicle (S86: NO), the PU 62 transitions to the process of S90. In the process of S90, the PU 62 substitutes "0" into the right play compensation amount αR, and substitutes the left play base amount αL0 into the left play compensation amount αL.

On the other hand, in the case where the PU 62 determines that the flag F2 is "1" (S80: YES), the PU 62 determines whether the near vehicle has disappeared, based on a notice from the higher-level ECU 80 (S92). For example, in the case where the vehicle does not exist within a predetermined distance from the own vehicle on a lane adjacent to the traveling lane of the own vehicle, the higher-level ECU 80 gives a notice indicating that the near vehicle has disappeared, to the steering control device 60.

In the case where the PU 62 determines that the near vehicle has disappeared (S92: YES), the PU 62 substitutes "0" into the flag F2 (S94). Then, in the case where the PU 62 completes the process of S94 or makes the negative determination in the process of S82, the PU 62 transitions to the process of S96. In the process of S96, the PU 62 substitutes the right play base amount αR0 into the right play compensation amount αR, and substitutes the left play base amount αL0 into the left play compensation amount αL.

In the case where the PU 62 completes the process of S88. S90, or S96 or makes the negative determination in the process of S92, the PU 62 ends the sequence of processes shown in FIG. 7 once.

Operation and Effect of Embodiment

Figure 8A:
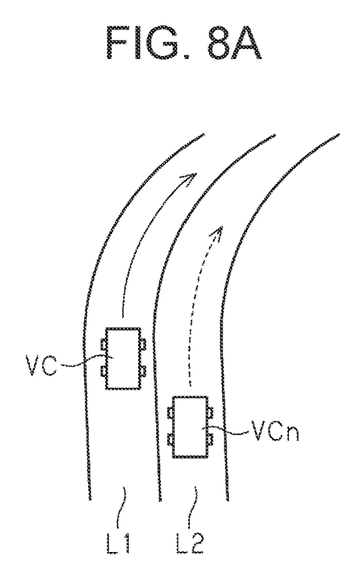
FIG. 8A is a diagram showing an example in which there is a near vehicle.
Figure 8B:
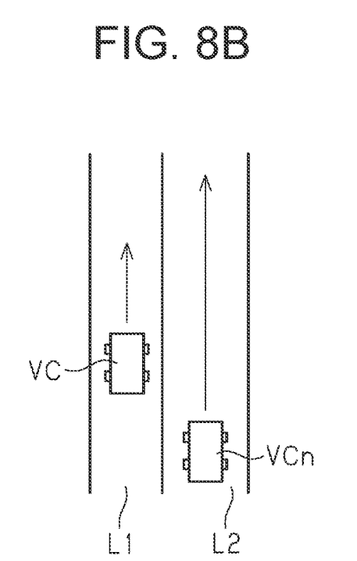
FIG. 8B is a diagram showing an example in which there is a near vehicle.

FIG. 8A and FIG. 8B show situations where a near vehicle VCn travels on a lane L2 adjacent to a lane L1 on which the own vehicle VC travels. FIG. 8A shows a case where the lanes L1, L2 are curved in the right direction. FIG. 8B shows a case where the lanes L1, L2 are straight traveling routes. Each of the FIG. 8A and FIG. 8B shows an example in which the near vehicle VCn travels on the lane L2 on the right side of the lane L1 on which the own vehicle VC travels.

In this case, the higher-level ECU 80 sends the information indicating that there is an adjacent vehicle and the position information, to the steering control device 60. Thereby, the PU 62 adjusts the right play compensation amount αR to zero. Therefore, in the case where the target angle θt* set by the higher-level ECU 80 for causing the vehicle to travel along the lane changes in the right steering direction, the play compensation amount Δθ is adjusted to zero. Therefore, it is possible to restrain the steering shaft 14 from rapidly rotating such that the vehicle approaches the adjacent vehicle.

Third Embodiment

For a third embodiment, differences from the first embodiment will be mainly described below with reference to the drawings.

Figure 9:
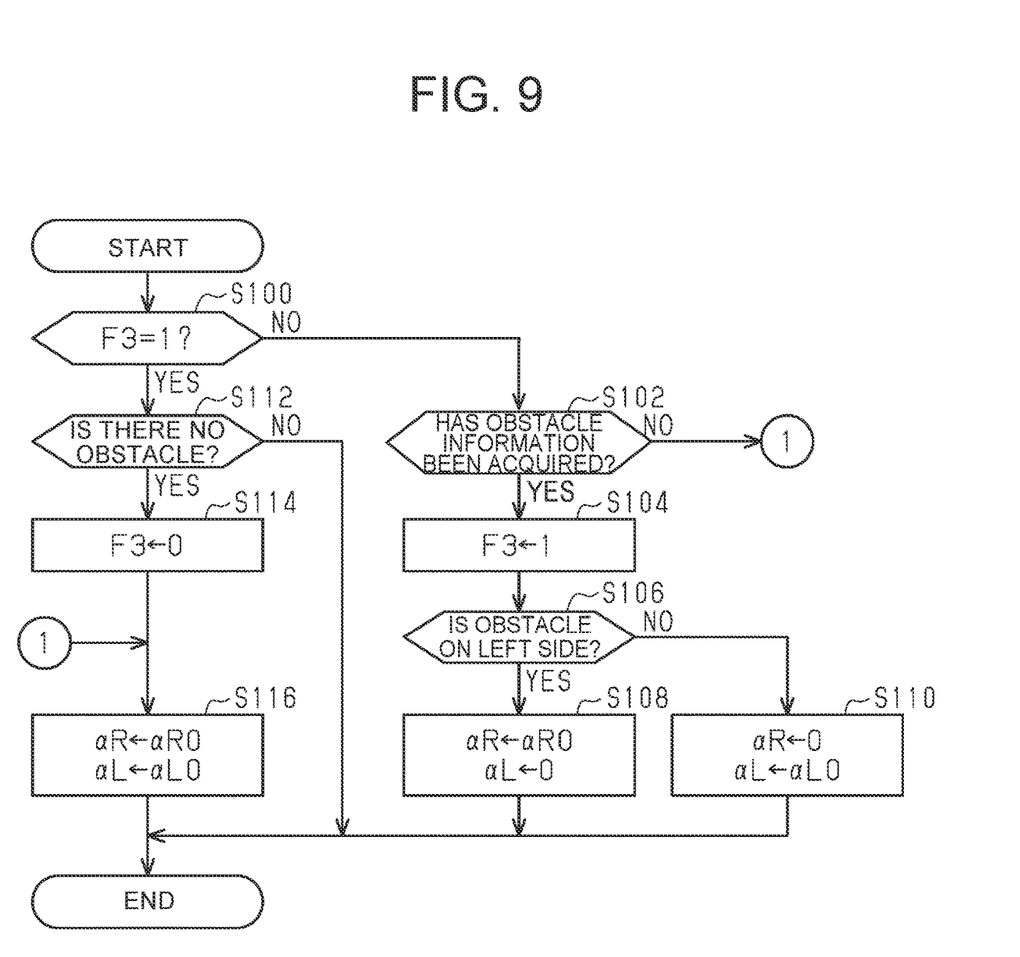
FIG. 9 is a flowchart showing a procedure of a process that is executed by a control device according to a third embodiment.

In the embodiment, a process in which the higher-level ECU 80 constantly performs the steering intervention such that the vehicle travels along the lane is assumed as an automatic driving process. FIG. 9 shows a procedure of a process relevant to the setting of the play compensation amount according to the embodiment. The process shown in FIG. 9 is realized when the PU 62 repeatedly executes a program stored in the storage device 64 with a predetermined period, for example.

In a sequence of processes shown in FIG. 9, first, the PU 62 determines whether a flag F3 is "1" (S100). In the case where the flag F3 is "1", there is a physical body that obstructs the traveling at a traveling-directional forward position relative to the own vehicle. In the case where the flag F3 is "0", there is no physical body that obstructs the traveling at the traveling-directional forward position relative to the own vehicle. In the case where the PU 62 determines that the flag F3 is "0" (S100: NO), the PU 62 determines whether information relevant to the obstacle at the traveling-direction forward position has been acquired from the higher-level ECU 80 (S102). That is, in the embodiment, the higher-level ECU 80 constantly monitors whether there is a physical body that obstructs the traveling of the vehicle at the traveling-directional forward position relative to the own vehicle, based on the image data by the camera 82, and the like. Then, in the case where there is the obstacle, the higher-level ECU 80 gives a notice of information indicating that there is the obstacle and position information about the obstacle, to the steering control device 60.

In the case where the information relevant to the obstacle has been acquired (S102: YES), the PU 62 substitutes "1" into the flag F3 (S104). Then, the PU 62 determines whether the obstacle is on the left side, based on the acquired information (S106). In the case where the PU 62 determines that the obstacle is on the left side (S106: YES), the PU 62 transitions to the process of S108. In the process of S108, the PU 62 substitutes the right play base amount αR0 into the right play compensation amount αR, and substitutes "0" into the left play compensation amount αL.

On the other hand, in the case where the PU 62 determines that the obstacle is on the right side of the own vehicle (S106: NO), the PU 62 transitions to the process of S110. In the process of S110, the PU 62 substitutes "0" into the right play compensation amount αR, and substitutes the left play base amount αL0 into the left play compensation amount αL.

On the other hand, in the case where the PU 62 determines that the flag F3 is "1" (S100: YES), the PU 62 determines whether the obstacle has disappeared, based on a notice from the higher-level ECU 80 (S112). For example, in the case where the obstacle does not exist within a predetermined distance from the own vehicle at the traveling-directional forward position and a specified lateral distance from the own vehicle relative to the own vehicle, the higher-level ECU 80 gives a notice indicating that the obstacle has disappeared, to the steering control device 60.

In the case where the PU 62 determines that the obstacle has disappeared (S112: YES), the PU 62 substitutes "0" into the flag F3 (S114). Then, in the case where the PU 62 completes the process of S114 or makes the negative determination in the process of S102, the PU 62 transitions to the process of S116. In the process of S116, the PU 62 substitutes the right play base amount αR0 into the right play compensation amount αR, and substitutes the left play base amount αL0 into the left play compensation amount αL.

In the case where the PU 62 completes the process of S108. S110, or S116 or makes the negative determination in the process of S112, the PU 62 ends the sequence of processes shown in FIG. 9 once.

Fourth Embodiment

For a fourth embodiment, differences from the second embodiment will be mainly described below with reference to the drawings.

Figure 10:
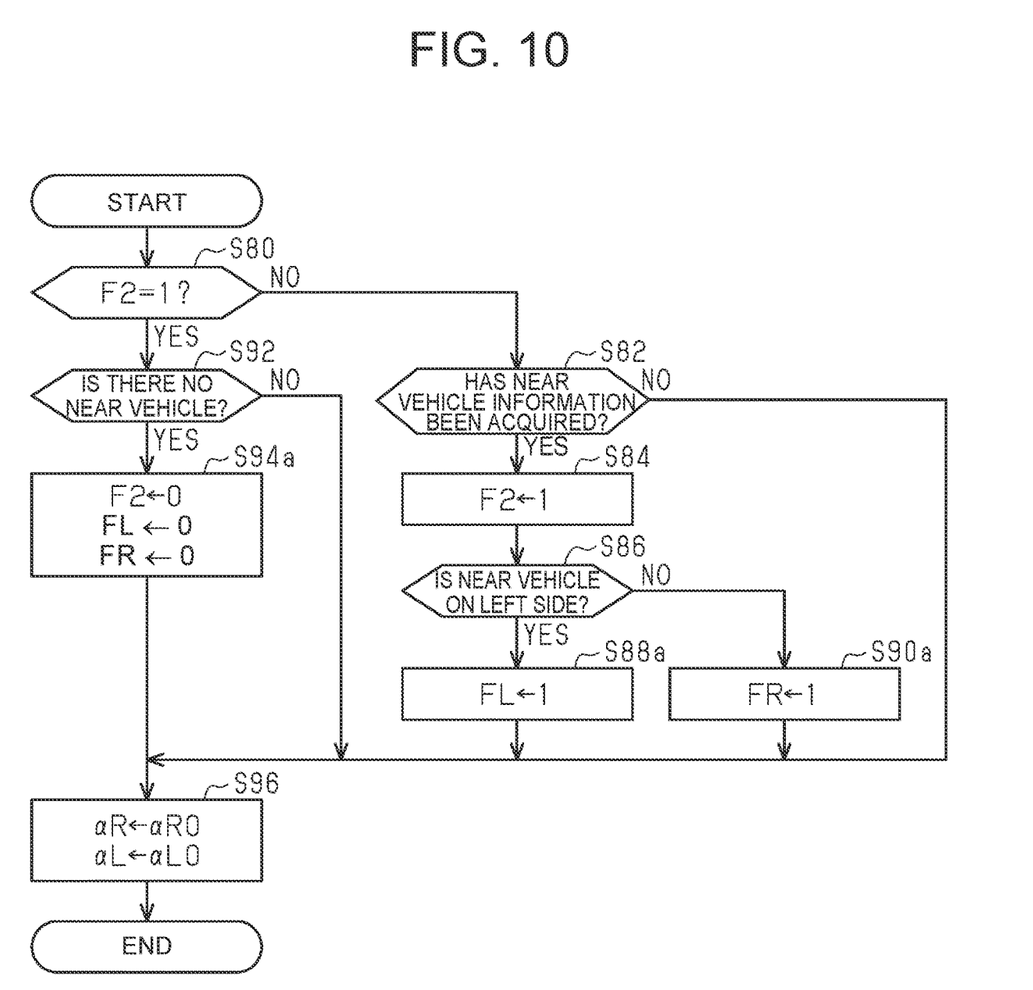
FIG. 10 is a flowchart showing a procedure of a process that is executed by a control device according to a fourth embodiment.

In the embodiment, in the case where there is the near vehicle, the change speed of the play compensation amount Δ is restricted to a small side, instead of restricting the magnitude of the play compensation amount Δ to the small side. FIG. 10 shows a procedure of a process relevant to the setting of the play compensation amount according to the embodiment. The process shown in FIG. 10 is realized when the PU 62 repeatedly executes a program stored in the storage device 64 with a predetermined period, for example. In FIG. 10, for convenience, processes corresponding to processes shown in FIG. 7 are denoted by identical step numbers.

In a sequence of processes shown in FIG. 10, in the case where the PU 62 determines that the near vehicle is on the left side (S86: YES), the PU 62 substitutes "1" into a flag FL (S88a). In the case where the near vehicle is on the left side, the flag FL is "1". In the case where the near vehicle is not on the left side, the flag FL is "0". On the other hand, in the case where the PU 62 determines that the near vehicle is on the right side (S86: NO), the PU 62 substitutes "1" into a flag FR (S90a). In the case where the near vehicle is on the right side, the flag FR is "1". In the case where the near vehicle is not on the right side, the flag FR is "0".

In the case where the PU 62 determines the near vehicle has disappeared (S92; YES), the PU 62 substitutes "0" into each of the flags F2, FL, FR (S94a). In the case where the PU 62 completes the process of S88a, S90a, or S94a or makes the negative determination in the process of S82 or S92, the PU 62 transitions to the process of S96.

Figure 11:
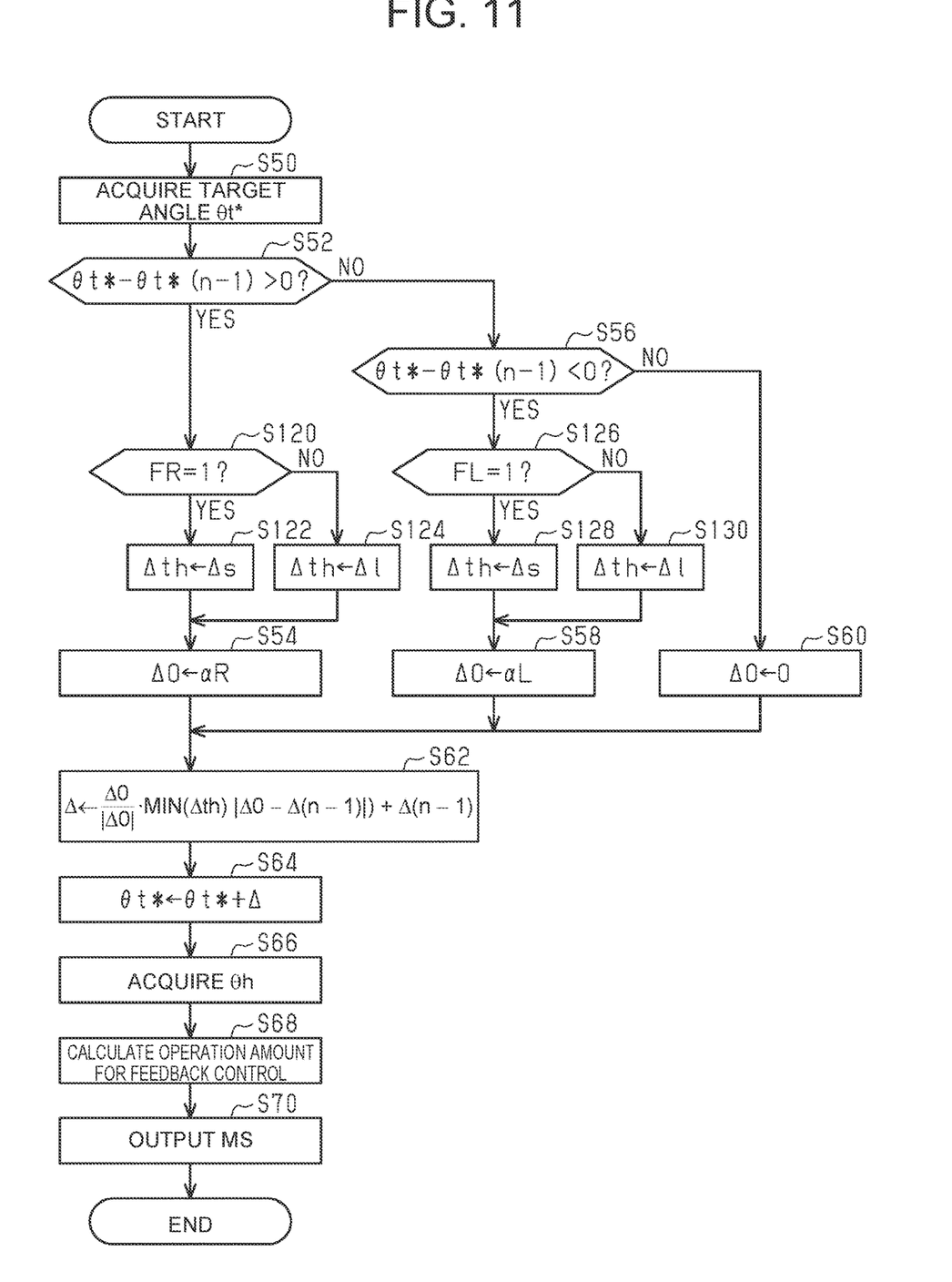
FIG. 11 is a flowchart showing a procedure of a process that is executed by the control device according to the fourth embodiment.

FIG. 11 shows a procedure of a process relevant to the control of the turning angle. The process shown in FIG. 11 is realized when the PU 62 repeatedly executes a program stored in the storage device 64 with a predetermined period in the automatic steering mode, for example. In the process shown in FIG. 11, for convenience, processes corresponding to processes shown in FIG. 6 are denoted by identical step numbers.

In a sequence of processes shown in FIG. 11, in the case where the PU 62 determines that the change in the target angle θt* is change in the right steering direction (S52: YES), the PU 62 determines whether the flag FR is "1" (S120). In the case where the PU 62 determines that the flag FR is "1" (S120: YES), the PU 62 substitutes a restriction value Δs into the upper limit 4th (S122). On the other hand, in the case where the PU 62 determines that the flag FR is "0" (S120: NO), the PU 62 substitutes an ordinary value Δl into the upper limit Δth (S124). The ordinary value Δl is set to a larger value than the restriction value Δs.

In the case where the PU 62 completes the process of S122 or S124, the PU 62 transitions to the process of S54. On the other hand, in the case where the PU 62 determines that the change in the target angle θt* is change in the left steering direction (S56: YES), the PU 62 determines whether the flag FL is "1" (S126). In the case where the PU 62 determines that the flag FL is "1" (S126: YES), the PU 62 substitutes the restriction value Δs into the upper limit Δth (S128). On the other hand, in the case where the PU 62 determines that the flag FL is "0" (S126: NO), the PU 62 substitutes the ordinary value Δl into the upper limit Δth (S130).

In the case where the PU 62 completes the process of S128 or S130, the PU 62 transitions to the process of S58. In the case where the near vehicle is on the right side and where the change in the target angle θt* is change in the right steering direction, the PU 62 restricts the speed at which the play compensation amount Δ approaches the play compensation amount Δ0, to a small side. Thereby, it is possible to restrain the occurrence of an affair in which the control of the vehicle is rapidly performed such that the vehicle approaches the near vehicle.

The correspondence relation between the matters in the above embodiments and the matters described in SUMMARY is shown as follows. The correspondence relation will be shown below for each of the numbers of the solutions described in SUMMARY. [1. 4] The target rudder angle variable acquisition process corresponds to the process of S50. The attention information acquisition process corresponds to the process of S32 in FIG. 4, the processes of S82 and S86 in FIG. 7 and FIG. 10, and the processes of S102 and S106 in FIG. 9. The target rudder angle correction process corresponds to the process of S64. The restriction process corresponds to the processes of S38 and S40 in FIG. 4, the processes of S88 and S90 in FIG. 7, the processes of S108 and S110 in FIG. 9, and the processes of S122 and S128 in FIG. 11. The rudder angle control process corresponds to the processes of S68 and S70. [2] The restriction process corresponds to the processes of S38 and S40 in FIG. 4, the processes of S88 and S90 in FIG. 7, and the processes of S108 and S110 in FIG. 9. [3] The restriction process corresponds to the processes of S122 and S128 in FIG. 11. [5] The play displacement calculation process corresponds to the processes of S10 to S22. The base amount setting process corresponds to the processes of S24 and S26. [6] The restriction process corresponds to the processes of S38 and S40 in FIG. 4. [7] The restriction process corresponds to the processes of S88 and S90 in FIG. 7 and the processes of S122 and S128 in FIG. 11. [8] The restriction process corresponds to the processes of S108 and S110 in FIG. 9.

Other Embodiments

The embodiments can be carried out while being modified as follows. The embodiments and the following modifications can be carried out while being combined with each other, as long as there is no technical inconsistency.

The information that is acquired by the attention information acquisition process is not limited to the above-described information. For example, information indicating that an edge of a road surface on which the vehicle travels faces a cliff may be adopted.

The process of restricting the magnitude of the play compensation amount to the small side is not limited to the process of the restriction to zero. For example, in the process of S38, the magnitude of the left play compensation amount αL may be set to a value that is larger than zero and that is smaller than the magnitude of the left play base amount αL0.

In the process exemplified in FIG. 7, it is assumed that the number of lanes in the direction of the traveling of the own vehicle is two, but the present disclosure is not limited to this. The number of lanes may be three or more. In that case, there is a possibility that near vehicles are on both of the right side and left side of the own vehicle. In that case, both of the right play compensation amount αR and the left play compensation amount αL may be set to "0". However, the present disclosure is not limited to this. For example, in the case of a traveling route that is curved to the right side as shown in FIG. 8A, the right play compensation amount αR may be set to the right play base amount αR0.

The correction depending on whether there is the near vehicle may be switched depending on whether the curvature radius of the traveling route is equal to or larger than a straight-movement threshold. That is, for example, the way of the restriction may be altered between the example shown in FIG. 8A in which the curvature radius is smaller than the straight-movement threshold and the example shown in FIG. 8B in which the curvature radius is equal to or larger than the straight-movement threshold. For example, in the case of the example shown in FIG. 8B, the right play compensation amount αR may be set to zero, and in the case of the example shown in FIG. 8A, the magnitude of the right play compensation amount αR may be set to a magnitude that is larger than zero and that is smaller than the magnitude of the right play base amount αR0.

The process of restricting the magnitude of the change speed of the play compensation amount Δ to the small side may be applied when the departure avoidance control for the lane is executed. The process of restricting the magnitude of the change speed of the play compensation amount Δ to the small side may be applied in the case where the obstacle is at the traveling-directional forward position relative to the vehicle.

Both of the process of restricting the magnitude of the play compensation amount Δ to the small side and the process of restricting the magnitude of the change speed of the play compensation amount Δ to the small side may be executed. The target rudder angle variable is not limited to the value resulting from converting the turning angle of the turning wheel 40 into the rotation angle of the steering shaft 14. For example, the turning angle itself may be adopted. In that case, in the process of S68, a process in which the value resulting from converting the steering angle θh into the turning angle is adopted as the control amount and the target angle is adopted as the target value of the control amount may be executed.

In the gradual change process, for example, in the case where the play compensation amount Δ does not reach the play compensation amount Δ0 at the time when the change in the target angle θt* is stopped, the play compensation amount Δ may be changed until the play compensation amount Δ reaches the play compensation amount Δ0. This means that the play compensation amount Δ is changed to the right play compensation amount αR in the case where the target angle θt* transitions from the state of the change in the right steering direction to the state of the stop of the change, for example.

In the process of S62, the change speed of the upper limit Δth is a constant value, but the present disclosure is not limited to this. For example, the change acceleration of the upper limit Δth may be set to a previously determined acceleration. Further, for example, the change acceleration of the upper limit Δth may be altered depending on the change speed of the target angle θt*.

The automatic steering process that is executed in the automatic steering mode is not limited to the process exemplified in the above embodiments. For example, it is allowable to adopt a process in which the higher-level ECU 80 intervenes in the steering in the case where the vehicle is about to get contact with the obstacle when the driver is operating the steering wheel 12.

The rudder angle control process does not need to include the process of calculating the operation amount for the feedback control in which the steering angle θth is adopted as the control amount and the target angle θt* is adopted as the target value of the control amount. For example, a process of calculating an operation amount for an open-loop control in which the steering angle θh is adopted as a control amount and the target angle θt* is adopted as the target value of the control amount may be included. Further, for example, a process of calculating both of the operation amount for the feedback control and the operation amount for the open-loop control may be included.

The steering control device is not limited to the device that acquires the target angle θt* set by the higher-level ECU 80. For example, a device in which the steering control device 60 and the higher-level ECU 80 are integrated may be adopted.

The steering control device 60 is not limited to the device that includes the PU 62 and the storage device 64 and that executes software processing. For example, at least some of the processes that are executed by software processing in the above embodiments may be executed by a dedicated hardware circuit (for example, an ASIC) that performs hardware processing. That is, the steering control device may have one configuration of the following (a) to (c). (a) A processing unit that executes all of the above processes in accordance with programs and a program storage device that stores the programs, as exemplified by a ROM, are included. (b) A processing unit that executes some of the above processes in accordance with programs, a program storage device, and a dedicated hardware circuit that executes the remaining processes are included. (c) A dedicated hardware circuit that executes all of the above processes is included. A plurality of software processing circuits each of which includes a processing unit and a program storage device, or a plurality of dedicated hardware circuits may be provided. That is, the above process may be executed by a processing circuit that includes at least one of a single or a plurality of software processing circuits and a single or a plurality of dedicated hardware circuits.

What is claimed is:

1. A steering control device that controls a steering device, the steering device including a steering shaft, a turning wheel of a vehicle, the turning wheel turning due to rotation of the steering shaft, and a motor rotating the steering shaft, the steering control device comprising a processing unit configured to execute:

a target rudder angle variable acquisition process of acquiring a value of a target rudder angle variable, the target rudder angle variable being a variable that indicates a turning angle of the turning wheel;

an attention information acquisition process of acquiring information that needs to be given attention to for traveling of the vehicle;

a target rudder angle correction process of correcting the value of the target rudder angle variable by a play compensation amount corresponding to a steering direction, the steering direction being a direction in which the value of the target rudder angle variable changes;

a restriction process of restricting the correction of the value of the target rudder angle variable by the play compensation amount, depending on the information that needs to be given attention to; and a rudder angle control process of operating the motor by a control in which a steering angle depending on a rotation angle of the steering shaft is adopted as a control amount and the value of the target rudder angle variable is adopted as a target value of the control amount.

2. The steering control device according to claim 1, wherein the restriction process includes a process of restricting a magnitude of the play compensation amount to a small side.

3. The steering control device according to claim 1, wherein:

the processing unit is configured to further execute a gradual change process, the gradual change process being a process of gradually changing the play compensation amount depending on change in the steering direction; and the restriction process includes a process of restricting a speed of change in a magnitude of the play compensation amount, to a small side.

4. The steering control device according to claim 1, wherein the attention information acquisition process includes a process of acquiring at least one of three pieces of information: information relevant to a lane on which the vehicle travels, information relevant to another vehicle that is near the vehicle, and information relevant to a physical body that obstructs the traveling of the vehicle at a traveling-directional forward position.

5. The steering control device according to claim 1, wherein:

the processing unit is configured to execute the rudder angle control process in an automatic steering mode;

the processing unit is configured to further execute a play displacement calculation process and a base amount setting process;

the play displacement calculation process is a process of calculating a play displacement whenever the steering angle changes, the play displacement being an amount that identifies a position in a region where the turning angle does not change despite change in the steering angle;

the base amount setting process is a process of setting a play base amount corresponding to a right steering direction and a play base amount corresponding to a left steering direction, to amounts that allow the steering angle to be values of end portions of the region, depending on the play displacement at a time when the automatic steering mode is satisfied; and the restriction process includes a process of restricting a magnitude of the play compensation amount to a smaller value than a magnitude of the play base amount.

6. The steering control device according to claim 1, wherein:

the attention information acquisition process includes a process of acquiring information indicating that the vehicle departs from a lane; and the restriction process includes a process of restricting the correction of the value of the target rudder angle variable by the play compensation amount corresponding to the steering direction that is a direction in which the vehicle departs from the lane, when the information indicating that the vehicle departs from the lane is acquired.

7. The steering control device according to claim 1, wherein:

the attention information acquisition process includes a process of acquiring information relevant to another vehicle that is near the vehicle; and the restriction process includes a process of restricting the correction of the value of the target rudder angle variable by the play compensation amount corresponding to the steering direction that is a direction in which the vehicle approaches the other vehicle.

8. The steering control device according to claim 1, wherein:

the attention information acquisition process includes a process of acquiring information relevant to a physical body that obstructs the traveling of the vehicle at a traveling-directional forward position; and the restriction process is a process of restricting the correction of the value of the target rudder angle variable by the play compensation amount corresponding to the steering direction that is a direction in which the vehicle approaches the physical body.

* * * * *